W. PLOGMANN.
END GATE FOR WAGONS.
APPLICATION FILED DEC. 11, 1909.

962,385.

Patented June 21, 1910.
2 SHEETS—SHEET 1.

Witnesses
M. E. Fowler
James Mansfield

Inventor:
William Plogmann
By Alexander Sowell
Attorneys

W. PLOGMANN.
END GATE FOR WAGONS.
APPLICATION FILED DEC. 11, 1909.
962,385.
Patented June 21, 1910.
2 SHEETS—SHEET 2.
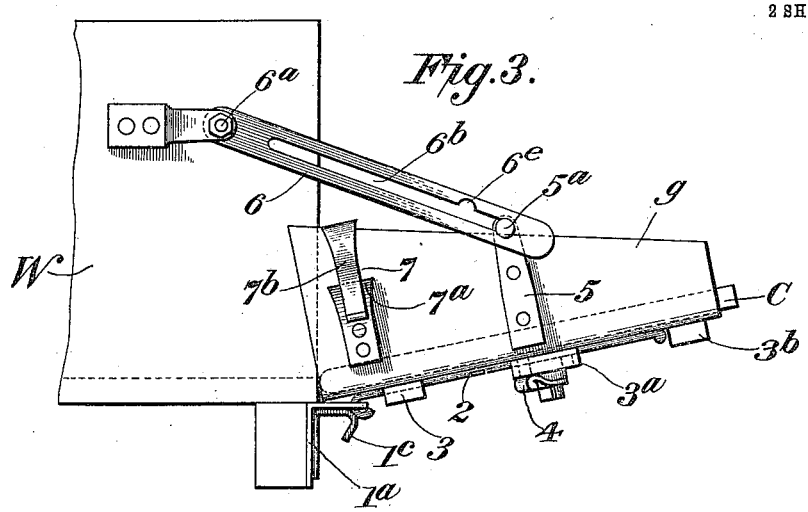
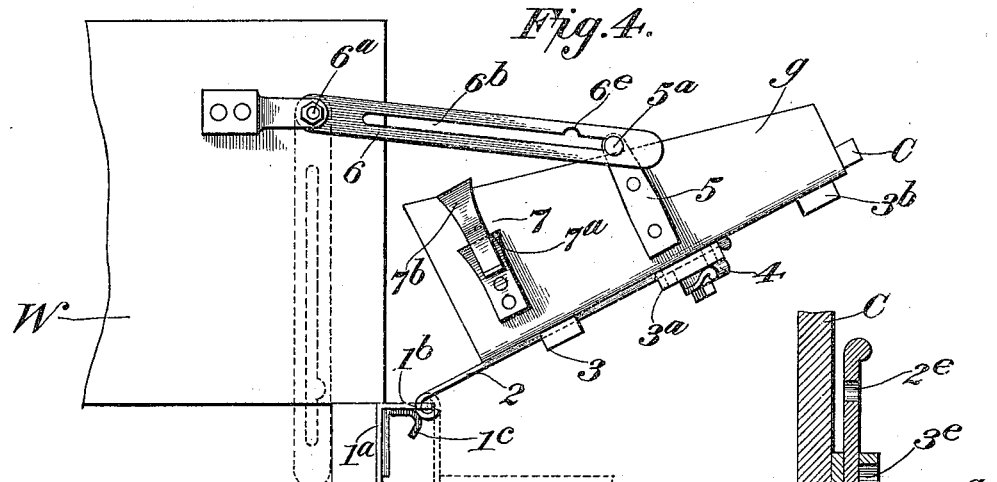
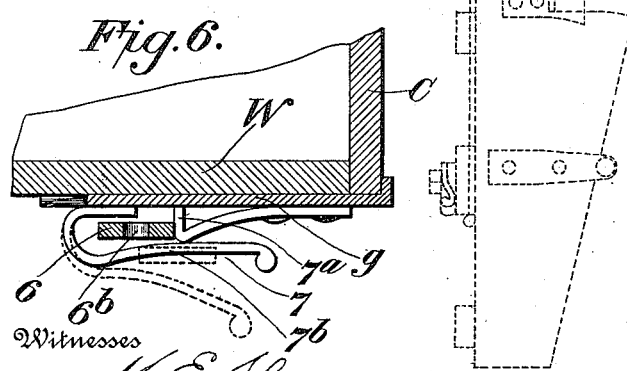
Inventor:
William Plogmann

UNITED STATES PATENT OFFICE.

WILLIAM PLOGMANN, OF DAVENPORT, IOWA.

END-GATE FOR WAGONS.

962,385.  Specification of Letters Patent.  Patented June 21, 1910.

Application filed December 11, 1909. Serial No. 532,589.

*To all whom it may concern:*

Be it known that I, WILLIAM PLOGMANN, of Davenport, in the county of Scott and State of Iowa, have invented certain new and useful Improvements in End-Gates for Wagons; and I hereby declare that the following is a full, clear, and exact description thereof, reference being had to the accompanying drawings, which form part of this specification.

This invention is an improvement in end-gates for wagons and its object is to provide a gate which can be used as a shovel-board; which can be raised so that the wagon can be dumped; can be dropped like an ordinary gate; and which can be entirely removed if desired.

The invention will be clearly understood by reference to the accompanying drawings which form part of this specification and the following description thereof; and I set forth in the claims the parts and combinations of parts for which protection is desired.

Figure 1:
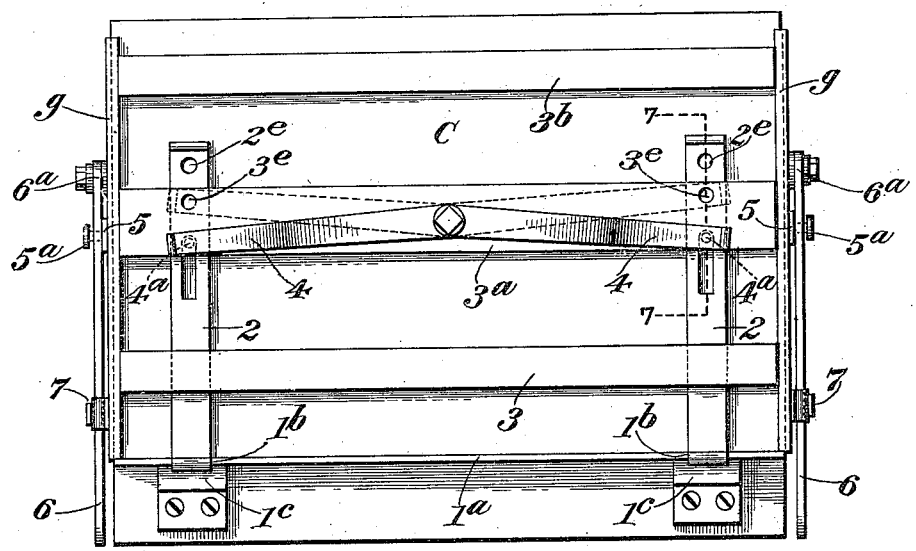
Figure 2:
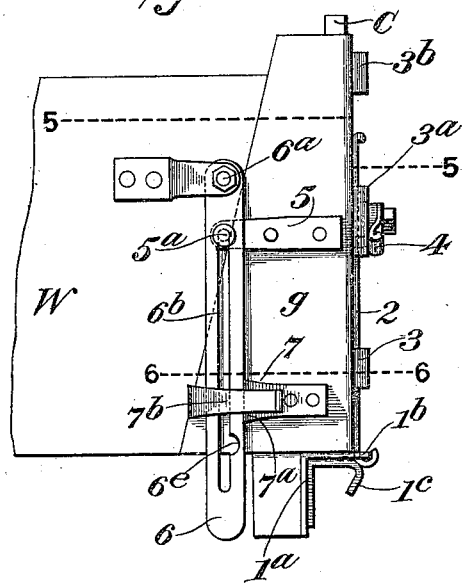
Figure 5:
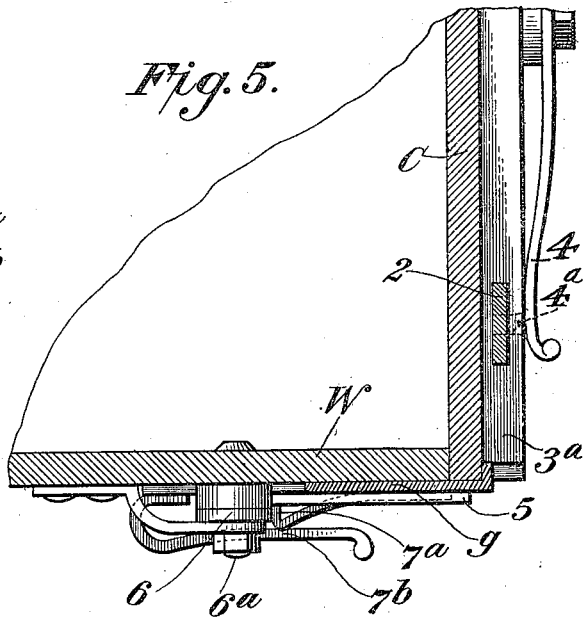

In said drawings—Figure 1 is a rear view of the gate closed. Fig. 2 is a side view thereof. Fig. 3 is a similar view showing the gate in shovel-board position. Fig. 4 is a view showing the end-gate in dumping position in full lines, and entirely dropped in dotted lines. Fig. 5 is a detail sectional view on line 5—5 of Fig. 2. Fig. 6 is a similar view on line 6—6 of Fig. 2. Fig. 7 is a detail sectional view on line 7—7 of Fig. 1.

W designates a wagon body, which may be of any usual construction, and has a transverse bar at its rear end, fastened to the bottom thereof; and to this bar is attached an angle iron $1^a$ which is provided with slots $1^b$ with which are engaged the hooked lower ends of hinge bars 2 by which the end gate C is detachably connected therewith. Brackets $1^c$ may be attached to the bar $1^a$ underneath slots $1^b$ to support the lower ends of the hinge bars 2 when the gate is adjusted to dumping position as indicated in Fig. 4.

The body of the gate may be formed of any suitable material, but is usually constructed of wood and braced by transverse bars 3, $3^a$, $3^b$. The outer ends of the two lower bars 3, $3^a$, are slotted for the accommodation of the hinge bars 2, and permit the gate to slide longitudinally on the hinge bars. Spring catches 4 are attached to the bar $3^a$ and have teeth $4^a$ on their ends adapted to project through holes $3^d$, $3^e$ (Fig. 7) in the bar $3^a$ and to engage with slots $2^d$ or holes $2^e$ in the hinge bars 2 for a purpose hereinafter explained.

The gate is provided with side pieces $g$ which are adapted to lap over the ends of the side pieces of the wagon body, when the gate is closed, and these pieces $g$ may be made of sheet metal. Attached to these side pieces $g$ near the center thereof are straps 5 which are provided with headed pins $5^a$ on their outer forward ends, and said pins are adapted to be engaged by slotted levers 6 which are pivoted to the side of the wagon body at $6^a$, and have slots $6^b$ which engage the headed pins $5^a$. When the levers 6 are swung to vertical position the gate is closed as indicated in Figs. 1 and 2 and may be held securely closed by engaging the lower ends of the levers with catches 7 attached to the lower portion of the sides $g$ as shown, see Figs. 2, 5 and 6. Each catch has a stop portion $7^a$ and a spring-retaining portion $7^b$ by which the lever is held in engagement with the stop portion, but it can be readily disengaged therefrom by pulling outward on the lower end of the lever until the lever is clear of the stop portion; and then the lever can be swung out of engagement with the stop portion.

When the teeth of the spring catches 4 are in engagement through holes $3^b$ with slots $2^d$ (Fig. 7), upon disengaging the levers 6 from the catches 7 the gate can be swung downward until the pins $5^a$ engage the lower ends of the slots $6^b$ in lever 6; then the gate will be held in position to act as a shovel-board, as indicated in Fig. 3. When the gate is dropped to shovel-board position as shown in Fig. 3, the slots $2^d$ permit the gate to slide inward over the angle-bar $1^a$ until the lower edge of the gate is in close contact with the rear edge of the bottom of the wagon. The levers 6 serve as braces to support the gate in this shovel-board position. When it is desired to close the gate again it is simply swung upward to closed position and levers 6 engage with catches 7 thus locking the gate in closed position.

If it is desired to dump the wagon the teeth of catches 4 are disengaged from holes $3^d$ and engaged with hole $3^e$; then the gate is lifted until the teeth of catches 4 engage the holes $2^e$ in the upper ends of hinge bars 2. This raises the lower end of the gate clear of the bottom of the wagon, and then the gate can be swung outward to the position shown in Fig. 4, the pins 5ª engaging the outer ends of lever 6 and holding the gate in the position shown in Fig. 4. When it is desired to close the gate it is swung inward again toward closed position, and catches 4 disengaged from the holes 2ᵉ and the gate is dropped back to closed position and locked by levers 6 as before.

If it is desired to entirely remove the gate the levers 6 may be disengaged from the pins 5ª by swinging the gate up to intermediate position where the heads of the pins 5ª come opposite enlargement 6ᵉ in the slots 6ᵇ at which point the levers 6 can be swung off the pins, and then the gate can be dropped to the position indicated in dotted lines in Fig. 4 and may then be readily removed; or can remain suspended out of the way in this dropped position, which will enable the vehicle to be backed up close to a building for loading or unloading.

Having described my invention what I claim as new and desire to secure by Letters Patent thereon is:

1. The combination with a wagon body, of an end gate, hinge straps slidably connected with said gate and provided with slots and perforations above the slots; and catches attached to the gate and adapted to be engaged with the slots or with the perforations, substantially as and for the purpose described.

2. The combination with a wagon body; an end gate, hinge straps slidably connected with said gate and provided with slots and perforations above the slots, spring catches attached to the gate and adapted to be engaged with the slots or with the perforations; and means for supporting the gate in open position and for locking the gate in closed position.

3. In combination, a wagon body, an end gate, hinge straps slidably connected with said gate and provided with slots and perforations above the slots, and spring catches attached to the gate and adapted to be engaged with the slots or with the perforations; with slotted levers pivoted to the sides of the wagon at their upper ends, pins on the sides of the gate engaging the said levers to hold the gate in open position, and catches on the sides of the gate adapted to engage the levers to lock the gate in closed position.

4. In combination with a wagon body, an angle iron bar attached to the rear end thereof, an end gate, hinge straps detachably connected with said bar and slidably connected with said gate, spring catches attached to the gate and adapted to be engaged with the straps, and means for locking the gate in closed position.

In testimony that I claim the foregoing as my own, I affix my signature in presence of two witnesses.

WILLIAM PLOGMANN.

Witnesses:
ADOLF CUYMANN,
C. J. R. CUYMANN.